United States Patent [19]
Glick, Jr. et al.

[11] 3,918,320
[45] Nov. 11, 1975

[54] GOVERNOR DEVICE FOR VEHICLE ACCELERATOR PEDAL

[76] Inventors: William C. Glick, Jr., 4843 English Ave., Indianapolis, Ind. 46201; Delbert W. Witte, 4621 Hartman Drive, Indianapolis, Ind. 46226

[22] Filed: Mar. 25, 1974

[21] Appl. No.: 454,748

[52] U.S. Cl. .................................. 74/513; 74/526
[51] Int. Cl.² ........................................ G05G 1/14
[58] Field of Search ............ 74/512, 513, 526, 539, 74/482, 560

[56] References Cited
UNITED STATES PATENTS 2,349,742   5/1944   Macavoy ........................... 74/526
2,567,529   9/1951   Schetzer .......................... 74/526 X
3,035,133   5/1962   Greenberg ........................ 74/526 X

*Primary Examiner*—Samuel Scott
*Assistant Examiner*—Frank H. McKenzie, Jr.
*Attorney, Agent, or Firm*—Robert A. Spray

[57] ABSTRACT

An adjustable governor device, easily clampable to an accelerator pedal, which provides a yieldable stop regulating depressibility of the pedal, but yieldably accommodating extra depression if forced by a continued force against the pedal.

11 Claims, 7 Drawing Figures

GOVERNOR DEVICE FOR VEHICLE ACCELERATOR PEDAL

This invention relates to a governor device, and its concepts provide an adjustable governor device clampable to a vehicle accelerator pedal for firmly but yieldingly engaging the vehicle floorboard at a selected maximum speed. This provides a yieldable engagement which limits depressibility of the pedal to that of the selected speed, achieving a first-stage governing effect, yet permits a forced depression of the pedal past that limit, into a second stage effect, as needed in an emergency situation.

The inventive concepts provide that no special installation skill or machanical known-how is required, for no holes need be provided in the vehicle body, no difficult connections or other hard installation steps are required, and no tools need be provided except some sort of wrench device. Most any vehicle-owner can easily install the device himself.

The concepts further provide that it is adjustable for whatever speed is desired, and it is adaptable for various sizes and shapes of accelerator pedals. And even though there is not much space between an accelerator pedal and the floorboard, the inventive concepts here further provide an easily installable governor device which is adjustable to any selected governed maximum speed, and provides and achieves the other advantages set forth herein.

A long life may be expected, for there is virtually no wear to the device. Other advantages provided by the inventive concepts are that it is easily removed, it requires no electrical fittings or connections, it requires no attachment to gasoline or fuel-air lines, takes no power, and requires no maintenance or lubrication.

Further, the inventive concepts provide that the setting of governed maximum speed is made with whatever tire-sizes, gear ratios, etc., the vehicle has which have an effect on vehicle-speed; thus no allowance need be made for those types of variables, and thus adjustment for any particular vehicle is unburdened by that type of complication.

These several advantages provide a novel and useful vehicle governor device for fuel economy particularly now desirable during the critical energy and gasoline shortage.

The concepts further provide a novel device wherein the engagement of the governor with the vehicle floor forcefully warns the driver by not only a warning but also by a definite stop or limiting of the pedal depressibility, yet yieldably accommodates further depressibility against a stiff enough spring that the driver must consciously realize that he is forcing the pedal to cause the vehicle to an excessive speed, a spring that forces a speed-lowering if the driver relaxes the extra-heavy foot-force necessary to "override" the first stage or ordinary governor effect of the device.

Fuel economy and limitation of vehicle speed will be achieved. Not only will sustained speed-limitation be achieved, but unduly fast or "jackrabbit" starts will be blocked. Other driving technique adjustments, for fuel economy, will be caused to be remembered by the driver.

Not only fuel economy, but the safety advantage of reduction of the amount and severity of accidents, are a hopeful and predictable effect of a widespread use of these devices.

The ease of installation, already indicated, also provides that the device is readily installed onto existing vehicles; and it is readily adjustable for installation on most all kinds and types of vehicles.

The above sets forth the concepts and details in an introductory manner. More specific details, concepts, and features are set forth in the following description of an embodiment illustrative of the inventive concepts, taken in conjunction with the accompanying somewhat schematic and diagrammatic drawings, in which.

Figure 4:
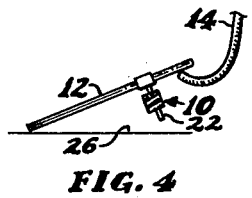
Figure 5:
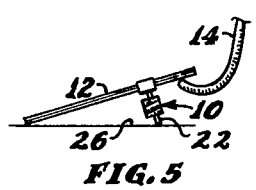
Figure 6:
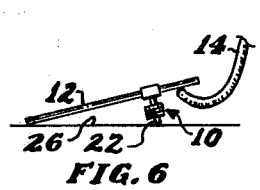
Figure 7:
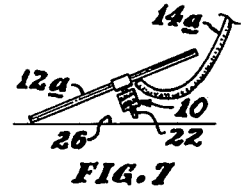

FIGS. 4, 5, and 6 are illustrative side-elevational views, illustrating the governor device and accelerator pedal in the conditions, respectively, of underspeed, governed speed, and overspeed of the vehicle; and FIG. 7 is an illustrative side-elevational view, generally similar to FIG. 4, but illustrating the governor device installed onto a different type accelerator and accelerator-linkage set-up.

CONSTRUCTION

As shown in the drawings, the novel governor device 10 is shown in its use on an associated vehicle accelerator 12 and a portion of the accelerator linkage 14. The pedal 12 and linkage 14 are shown for illustration of use only, and form no part of the invention; and, in contrast, they are shown of conventional design, for an advantage of this device is that it is easily installable on most all existing vehicles and with most all types of accelerator pedals.

The governor 10 shown has a pair of C-shaped clamp or pedal-gripper brackets 16, providing a first connector means which is connectingly engageable with the vehicle accelerator pedal 12 on each side 18 thereof.

A resiliently compressible governor assembly 20 is another major component of the governor device 10; and, at its lower end, and underneath the pedal 12, the governor assembly 20 is shown as having a bolt 22 wich (by its head 24) provides an abutment means abuttingly engageable with vehicle flooring structure 26 adjacent the accelerator pedal 12.

The threaded shank 28 of bolt 22 provides an adjustable means for locating the said abutment bolt 22 relative to the governor assembly 20.

A stiff compression spring 30 provides a body means which carries the bolt 22 and maintains a selected overall length of the governor assembly 20 (for is speed-governing function detailed below); but the spring 30 is yieldable to permit it to compress to permit the governor assembly 20 to assume a lesser overall length (for an accommodation of over-speed maneuvers in emergency situations, also as detailed below).

There are provided second connector means 32 which interconnect the clamp brackets 16 of the first connector means to the governor assembly 20; and, as detailed below, the pedal-gripping brackets 16 of the first connector means, and the said second connector means 32, are such that connection of the second connector means 32 to the brackets 16 causes the brackets 16 to connectingly grip the side edges 18 of the accelerator pedal 12.

Figure 1:
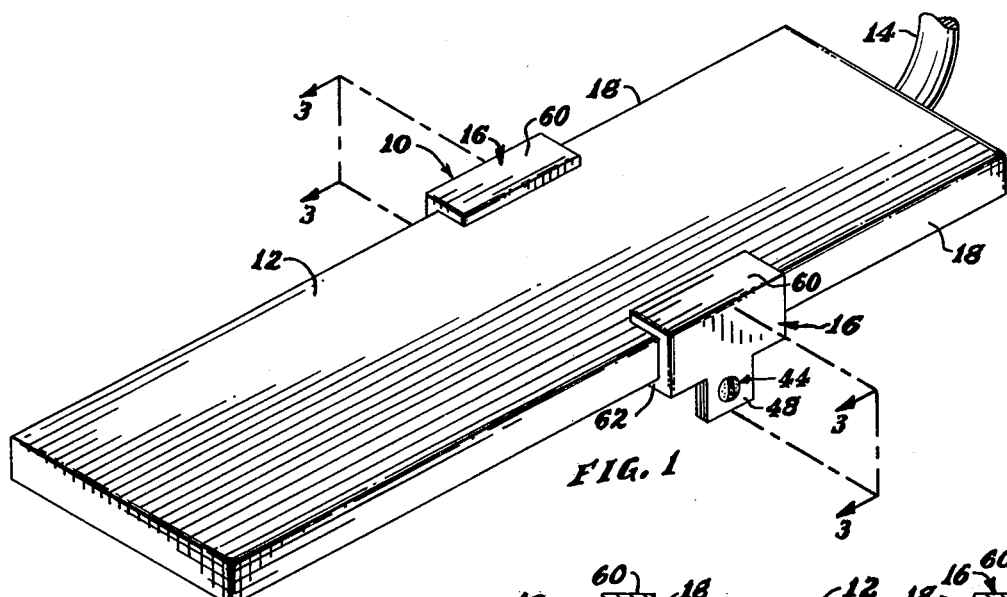
FIG. 1 is a pictorial view of a governor device installed on a vehicle's accelerator pedal.
Figure 2:
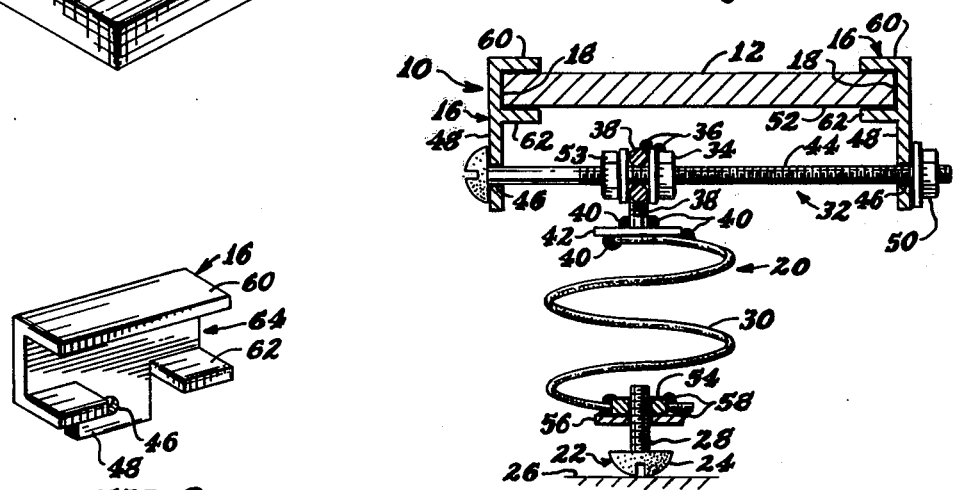
FIG. 2 is a pictorial view of one of the two pedal-gripping clamps or brackets.

It will be noted that the governor assembly 20 includes a nut 34 welded as at 36 to an eye-pin 38 connected as by welds 40 and a holding plate or washer 42 to the top end of the spring 30. This provides a screw-thread connection means of the governor assembly 20; and the second connector means 32 includes a screw threaded bolt means 44 which provides both a portion of the said second connector means 32 (by engagement with the threads of nut 34) and also a means for connection of said second connector means 32 to the brackets 16 of the first connector means (by passing through openings 46 in a downwardly-extending ear 48 thereof, FIG. 2, and having a nut 50 applied).

The screw-thread connection provided by the nut 34 atop governor assembly 20 provides a transverse locator means which provides and accommodates a laterally adjustable location of the governor assembly 20 and the pedal 12, desirable if the underside 52 of the pedal 12 has a web or stiffening rib or other protrusions which would interfere with a central mounting of the governor assembly 20.

A nut 53 on bolt 44, opposite nut 34, maintains a tight connection of the governor assembly 20 on bolt 44, by bearing against the nut 34 by pressure exerted on the eye-ring of eye-pin 38; this maintains a specific orientation of governor assembly 20 relative to the pedal 12, and minimizes a dis-orientation thereof which might in effect change the distance which the bolt 22 is removed from the pedal 12 and thus inadvertently change the governed speed setting of the bolt 22.

The lower end of spring 30 of the governor assembly 20 is shown provided with a nut 54, shown secured to the spring 30 and a holding plate or washer 56 as by welding 58, which provides, for the lower end of the said governor assembly 20, a female screw-threaded means which is adjustably and connectingly engageable with the abutment bolt 22.

This mounting of the abutment bolt 22 provides a conveniently adjustable speed regulation; for the setting of that bolt 22, and consequently the overall length of the governor assembly 20, determines the governed maximum first-stage-effect speed of the vehicle by limiting downward depression of the vehicle accelerator pedal 12, as described below.

The bolt 22 desirably has a tight fit with nut 54, or a lock-nut or jam-nut for the bolt shank 28 of bolt 22 may be provided, or other means provided for maintaining the setting of bolt 22, minimizing slippage of the bolt 22 out of adjustment.

Washers (which may be of locking type) may of course be provided as desired, e.g., for nuts 34, 50, nd 53, and for any retainer nuts or springs for bolt 22.

The pedal brackets 16, it will be noted, are shown as each having upper and lower flanges (respectively 60 and 62) which define a C-shaped recess 64 which embraces a sideedge 18 of the pedal 12 when the bracket 16 is assembled thereonto. The two brackets 16 may be identical; and, when formed from stiff sheet stock, the down-turned ear 48 is economically formed from a central portion of the lower flange 62, integrally therewith.

ACTUATION

Actuation is illustrated in FIGS. 4, 5, and 6, for a common type of accelerator pedal 12 in which the linkage 14 engages the pedal 12 quite near its forward end.

FIG. 4 illustrates the device 10 having been installed onto the pedal 12, but the pedal 12 being at a relatively upraised position corresponding to a vehicle-speed below the governed setting. In this low-speed situation, the governor 10 is unobtrusively present, but inactive.

FIG. 5 illustrates the situation with the vehicle travelling just at the governed speed, for as is illustrated, the abutment bolt 22 has just engaged the vehicle flooring, 26, that is, it has engaged the flooring 26 but with insufficient force from the driver's foot to compress the spring 30. The spring 30 is so stiff that this engagement of bolt 22 is forcibly felt by the driver's foot; and the device 10 thus serves to warn of maximum speed, providing a first-stage governor effect, by forcefully blocking against further pedal-depression, and forcefully maintains the vehicle speed at no more than that maximum (although of course permitting a slower speed by the driver raising his foot).

FIG. 6 illustrates an over-speed situation (hopefully just used in some sort of emergency maneuver) in which the driver has over-ridden the aforesaid first-stage effect by having pressed sufficiently on the pedal, with an extra-hard push, sufficient that the stiff spring 30 has been compressed. The stiffness of spring 30, however, forcefully urges the driver to reduce speed, in this second-stage effect permitted by this device, much more than does the spring-nature of the other parts of the throttle-control linkage or carburetor springs.

FIG. 7 illustrates a different type of pedal set-up, in which the linkage 14a engages the pedal 12a considerably rearward of the pedal's forward end. With this type arrangement, after the pedal 12a is depressed sufficiently to engage the bolt 22 onto the flooring 26, at the governed vehicle-speed situation, the driver can then attain an overspeed maneuver either by pushing harder (as just explained in connection with FIG. 6), or he can push on the forward end of the pedal 12a; but either type of foot-action to achieve the overspeed maneuver is such as to cause him to realize he is in an overspeed situation.

INSTALLATION AND ADJUSTABILITY

Installation and adjustability have been discussed generally in describing the construction hereinabove; and thus just brief comments here will be made to certain of these factors.

Figure 3:
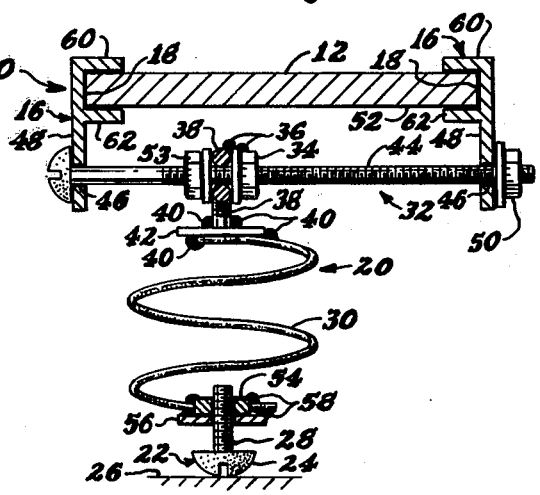
FIG. 3 is a cross-sectional view of the governor device assembled onto a vehicle accelerator pedal, generally as indicated by View-lines 3—3—3—3 of FIG. 1.

Installation requires only very simple and usually-available tools such as merely a screw-driver for bolt 44, and an open-end wrench for nuts 50 and 53. (The governor assembly 20 will have been swung prior to installation of the clamps 16 onto the pedal 12, around the connector bolt 44 to a central location therealong or a non-central location (such as is illustrated in FIG. 3) to avoid interfering protrusions on the underside 52 of pedal 12.)

The bolt 44 is long enough to accommodate various widths of pedals 12, and the bracket ears 48 are long enough to provide the holes 46 sufficiently removed from the pedal-recesses 64 of the brackets 16 that most under-pedal protrusions of pedal-bottom 52 are avoided, and there is sufficient clearance for a wrench to grasp the nut 53; although the relatively small amount of space below most pedals 12 means that the ears 48 must of course not be excessively long.

The easy adjustability of the abutment bolt 22 is done by trial and error method, to "set" the device 10 for the specific maximum (first-stage effect) speed desired.

Sometimes a passenger could do the adjusting or setting of that bolt 22 when another is driving along; or, by a "one-man" setting task, the driver just tries a few settings of the bolt 22. But it is not difficult. And, as stated above, the setting is automatically for the individual vehicle as it then exists, regardless of factor such as tire size, gear ratios, and other factors influencing a relation of vehicle speed to engine speed, etc.

SUMMARY COMMENTS

It is thus seen that a vehicle governor device according to the inventive concepts provides a novel and advantageous governor for a vehicle, providing the several advantages of: (a) convenience and ease of installation; (b) positiveness of actuation providing a definitely-blocked first-stage effect but permitting an emergency overriding thereof for a faster speed (with a different "feel" to the driver in each stage); (c) applicability to most all existing vehicles without difficult installation of lines or boring holes or preparing mountings; (d) accommodation of various types and sizes of vehicle accelerator pedals; (e) independence of variable factors such as tire size and gear ratios by providing that the "setting" is made on the particular vehicle as it then exists; (f) accommodation of under-pedal irregularities or protrusions by providing means for off-center mounting; (g) ease of governed-speed change; (h) ease of removal; (i) unobtrusiveness; (j) utilization of the relatively small under-pedal space to achieve all these advantages; (k) economy of production, using standard and commonly-available parts except the clamp-brackets, but they are capable of being economically formed from sheet stock; and (l) the various advantages of a vehicle governor including fuel-economy and lessening the chance or severity of accidents.

Accordingly, it will thus be seen from the foregoing description of the invention according to this illustrative embodiment, considered with the accompanying drawings, that the present invention provides a new and useful governor device having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A governor device for a vehicle accelerator pedal, comprising:
    first connector means connectingly engageable with the vehicle accelerator pedal;
    a resiliently compressible governor assembly;
    second connector means interconnecting the first connector means and the said governor assembly;
    said governor assembly having an abutment means abuttingly engageable with vehicle structure adjacent said pedal, and adjustable means locating the said abutment means at a selected position relative to the accelerator pedal when the governor assembly is connected to the accelerator pedal through both of said connector means, and there is provided body-means for the governor assembly which firmly maintain a selected overall length of the governor assembly but is yieldable to provide its resilient compressibility which permits it to nevertheless assume a lesser overall length;
    in which the first connector means comprise a pair of pedal-gripper members, and said second connector means interconnect both of said pair;
    in a combination in which the said first connector means and the said second connector means are such that connection of the second connector means to the first connector means causes the first connector means to connectingly grip the said pedal by gripping both lateral edges of the pedal, and with the the second connector means underlying the pedal and spanning across it in connection engagement with the pedal-gripper members of the first connector means at the lateral sides of the pedal.

2. The invention as set forth in claim 1 in a combination in which locator means are provided which accommodate an adjustable location of the said governor assembly and the said pedal.

3. The invention as set forth in claim 2 in a combination in which said locator means are provided by a screw threaded bolt means which also provides both a portion of the said second connector means and also a means for connection of said second connector means to the first connector means.

4. The invention as set forth in claim 3 in a combination in which the said governor assembly includes a female screw-threaded means which is connectingly-engageable with the said bolt means.

5. The invention as set forth in claim 1 in a combination in which the abutment means are adjustably located relative to the governor assembly by screw thread adjustment means.

6. The invention as set forth in claim 5 in a combination in which the said abutment means is carried on a screw-threaded bolt member which provides the said screw thread adjustment means for adjustably locating the said abutment means relative to the governor assembly.

7. The invention as set forth in claim 1 in a combination in which the adjustable locating means for the abutment means provides the selective positioning thereof by providing its selective positioning with respect to the governor assembly.

8. The invention as set forth in claim 1 in a combination in which the adjustable means for selective location of the said abutment means is of a nature which is adjustable to provide the aforesaid relative positioning of the said abutment means while both of the said connector means are fulfilling their connecting functions by which the governor assembly is operatively connected to the said accelerator pedal.

9. A governor device for a vehicle accelerator pedal, comprising:
    first connector means connectingly engageable with the vehicle accelerator pedal;
    a resiliently compressible governor assembly;
    second connector means interconnecting the first connector means and the said governor assembly;
    said governor assembly having an abutment means abuttingly engageable with vehicle structure adjacent said pedal, and adjustable means locating the said abutment means at a selected position relative to the accelerator pedal when the governor assembly is connected to the accelerator pedal through both of said connector means, and there is provided body-means for the governor assembly which firmly maintain a selected overall length of the governor assembly but is yieldable to provide its resilient compressibility which permits it to nevertheless assume a lesser overall length;

in which the first connector means comprise a pair of pedal-gripper members, and said second connector means interconnect both of said pair;

in a combination in which the governor assembly includes a screw-thread means, and the second connector means includes a screw threaded bolt means which provides both a portion of the said second connector means and also a means for connection of said second connector means to the first connector means.

10. A governor device for a vehicle accelerator pedal, comprising:
   first connector means connectingly engageable with the vehicle accelerator pedal;
   a resiliently compressible governor assembly;
   second connector means interconnecting the first connector means and the said governor assembly;
   said governor assembly having an abutment means abuttingly engageable with vehicle structure adjacent said pedal, and adjustable means locating the said abutment means at a selected position relative to the accelerator pedal when the governor assembly is connected to the accelerator pedal through both of said connector means, and there is provided body-means for the governor assembly which firmly maintain a selected overall length of the governor assembly but is yieldable to provide its resilient compressibility which permits it to nevertheless assume a lesser overall length;

in which the first connector means comprise a pair of pedal-gripper members, and said second connector means interconnect both of said pair;

in a combination in which the pedal-gripper members are formed of generally C-shaped bracket members adapted to receive the side edges of the pedal, and each having a downwardly-extending ear which is provided with an opening receiving said second connector means.

11. The invention as set forth in claim 10 in a combination in which the second connector means underlies the pedal and spans across it in connection engagement with the pedal-gripper members of the first connector means at the lateral sides of the pedal.

* * * * *